United States Patent [19]
Keichinger

[11] 3,974,908
[45] Aug. 17, 1976

[54] BIN SWEEPER

[76] Inventor: Albert Keichinger, Lloydminster, Sask-Alta, Canada

[22] Filed: Jan. 13, 1976

[21] Appl. No.: 648,682

Related U.S. Application Data

[63] Continuation of Ser. No. 457,652, April 3, 1974, abandoned.

[30] Foreign Application Priority Data
Aug. 14, 1973 Canada .............................. 178737

[52] U.S. Cl. ................................ 198/93; 198/104; 198/233
[51] Int. Cl.² .......................................... B65G 37/00
[58] Field of Search ................. 198/3, 7, 8, 64, 36, 198/87–89, 93–96, 104, 174, 213, 233

[56] References Cited
UNITED STATES PATENTS

| | | | |
|---|---|---|---|
| 2,397,420 | 3/1946 | Jorgensen | 198/233 X |
| 2,528,917 | 11/1950 | Slocum | 198/88 X |
| 2,569,871 | 10/1951 | Roscoe et al. | 198/213 X |
| 2,662,634 | 12/1953 | Tintes | 198/93 |
| 2,708,504 | 5/1955 | Puzey | 198/233 X |
| 3,141,541 | 7/1964 | Mayrath | 198/233 X |
| 3,175,676 | 3/1965 | Vander Schaaf | 198/213 X |
| 3,245,518 | 4/1966 | Reibel et al. | 198/198 |
| 3,297,148 | 1/1967 | Andrews | 198/89 X |
| 3,406,809 | 10/1968 | Mayrath | 198/213 X |
| 3,687,276 | 8/1972 | Pelletier | 198/233 |

Primary Examiner—Evon C. Blunk
Assistant Examiner—Richard K. Thomson
Attorney, Agent, or Firm—Stanley E. Johnson

[57] ABSTRACT

A power driven auxiliary conveyor assembly used in conjunction with a standard grain auger for sweeping grain on a supporting surface toward the infeed end of the grain auger. The auxiliary conveyor assembly consists of a longitudinally extending material conveying element driven by a hydraulic motor and in one form is an endless belt having cleats mounted thereon at longitudinally spaced intervals and, in a second embodiment, is a screw conveyor or auger. A sliding swivel connection, detachably connects the auxiliary conveyor assembly to the grain auger. The sliding connection facilitates loading the auxiliary conveyor assembly onto the grain auger so that it may be transported in a piggyback fashion. The pivot connection allows moving the auxiliary conveyor assembly relative to the grain auger during use.

6 Claims, 9 Drawing Figures

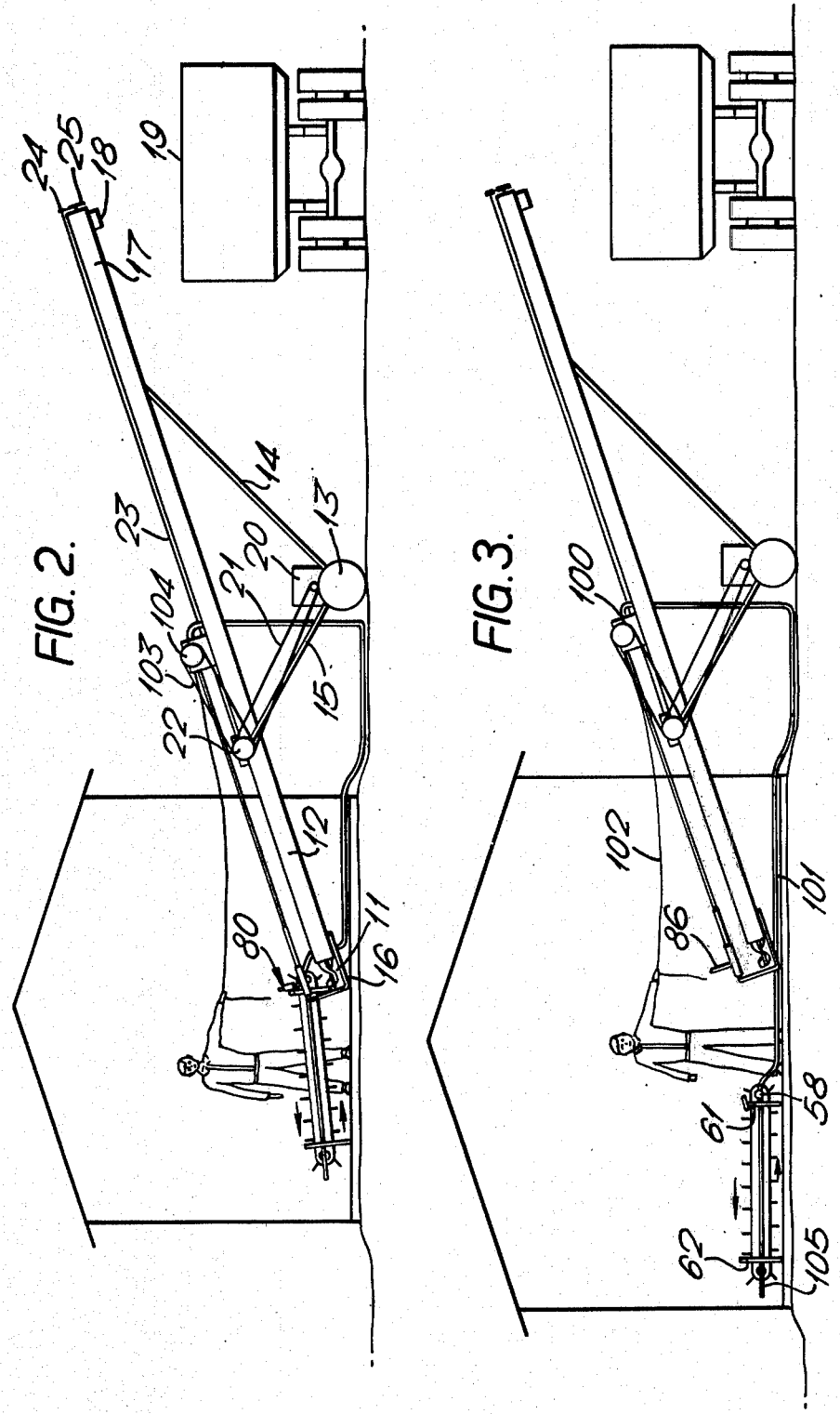

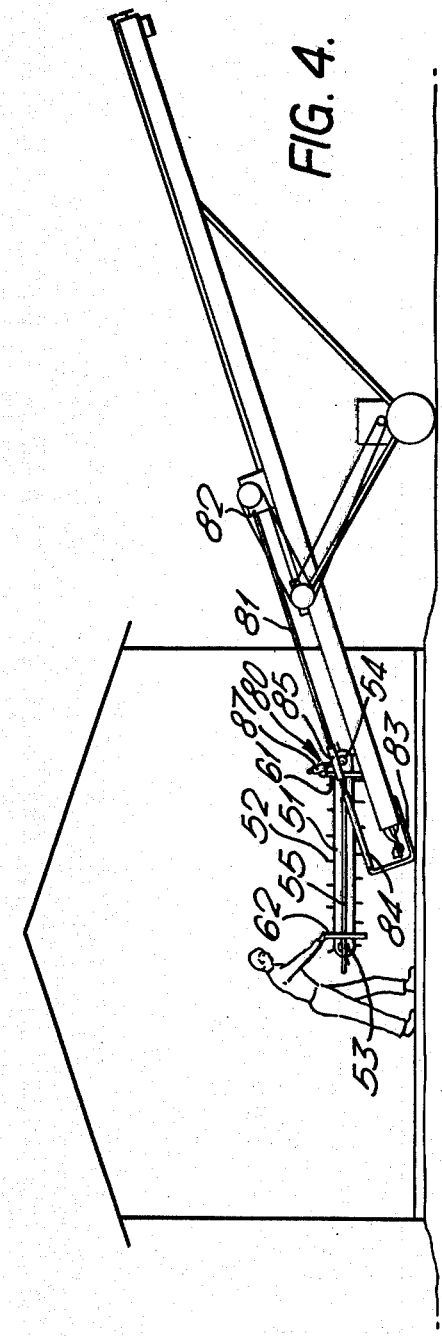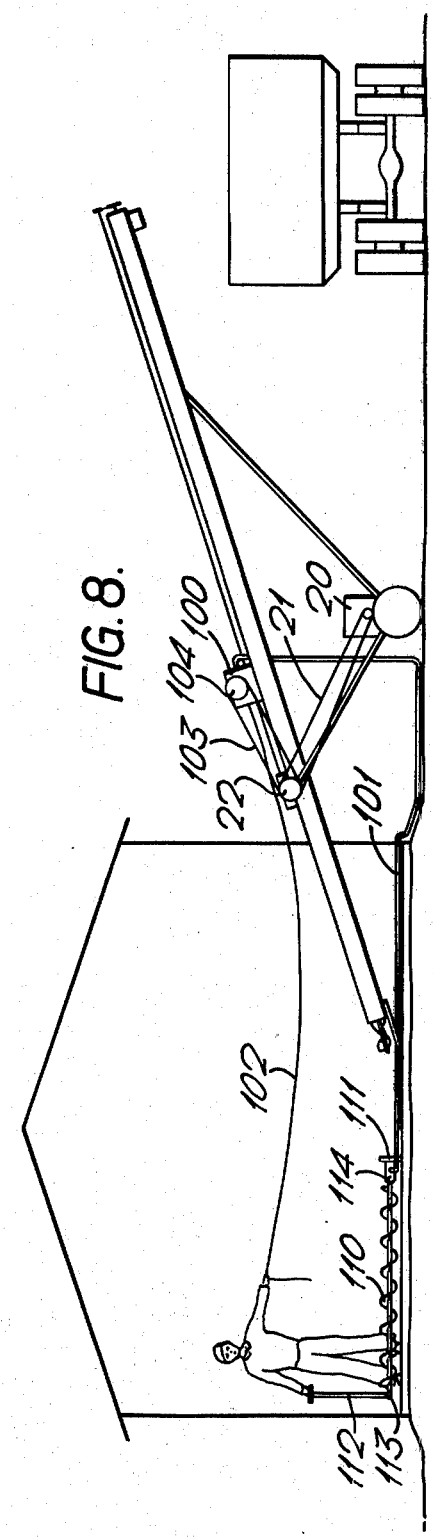

BIN SWEEPER

This is a continuation of application Ser. No. 457,652 filed Apr. 3, 1974 now abandoned.

This invention relates to a power driven auxiliary conveyor assembly for use with a grain auger to sweep grain on the floor of a bin toward the grain auger and to the combination of the grain auger and auxiliary conveyor assembly.

Portable grain augers for moving grain are well known consisting of an auger in a casing having an infeed end which is placed in the grain and a discharge end. In the past it has been necessary to manually move the grain in the bottom of a bin to the infeed end of the auger. Removing the grain from the bottom of the bin has thus been a laborious task.

A principal object of the present invention is to provide an auxiliary conveyor assembly for use in conjunction with grain conveyors to move the grain in the bin in a direction toward the infeed end of the coneyor.

A further principal object of the present invention is to provide an auxiliary conveyor assembly that is easily moved from one position to another when in use either attached to the grain auger adjacent the infeed end thereof or detached.

It is also a principal object of the present invention to provide an auxiliary conveyor assembly and means connecting the same to a grain auger for sliding and pivital movement relative thereto.

A further principal object of the present invention is to provide an auxiliary conveyor assembly for a grain auger which may be readily and safely controlled during operation minimizing hazardous risks to the operator using the same.

Accordingly, there is provided in accordance with the present invention an auxiliary conveyor assembly for use in conjunction with a grain auger or the like used to move material such as grain, fertilizer etc. from one position to another and having an infeed end and an outfeed end, said auxiliary conveyor assembly being used to sweep material toward the infeed end of the grain auger and comprising:
 a. a longitudinally extending conveyor assembly having a material conveying element;
 b. power means mounted on said conveyor assembly for driving said conveying element to move the grain adjacent thereto toward one end thereof;
 c. connecting means for detachably connecting one end of said conveyor assembly to said grain auger adjacent the infeed end thereof said connecting means including means for permitting pivotal movement of the auxiliary conveyor relative to the grain auger when attached thereto, and
 d. remote control means for controlling the driving of said conveying element.

The invention is illustrated by way of example with reference to the accompanying drawings wherein:

FIG. 2 is a side elevational view, partially diagrammatic, illustrating the auxiliary conveyor assembly extending from the infeed end of the grain auger to sweep grain on the bin floor toward the grain auger;

FIG. 3 is a view similar to FIG. 2 showing the auxiliary conveyor assembly detached from the infeed end of the grain auger;

FIG. 4 is a view similar to FIGS. 2 and 3 illustrating loading the auxiliary conveyor assembly into the grain auger;

FIG. 8 is a view similar to FIGS. 2, 3 and 4 showing a modified auxiliary conveyor assembly.

Figure 1:
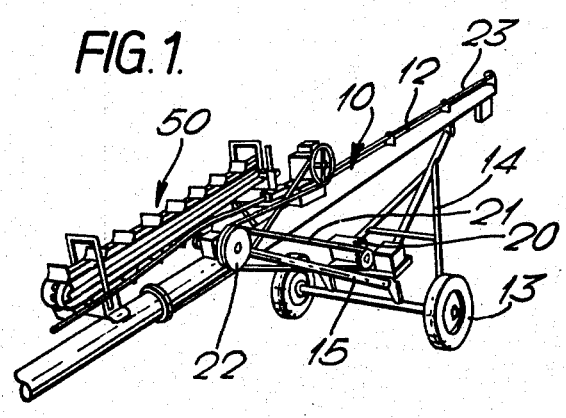
FIG. 1 is an oblique view of a common grain auger having an auxiliary conveyor assembly provided in accordance with the present invention mounted thereon for storage and transport.

Referring now in detail to the drawings, shown in FIG. 1 is a conventional grain auger 10 having an auxiliary conveyor assembly 50, provided in accordance with the present invention, mounted thereon for transport from one location to another. The assembly 50 is illustrated in FIG. 2 pivotally attached to the infeed end of the grain auger for sweeping grain on the floor of a bin toward the infeed of the grain auger 10. In FIG. 3 the assembly 50 is shown detached from the grain auger and in FIG. 4 the assembly 50 is being mounted onto the grain auger.

The conventional grain auger or conveyor 10 consists of an auger 11 mounted within a casing 12 carried by a pair of spaced apart wheel assemblies 13 supporting the conveyor tubular casing 12 by a number of supports 14 and 15. The grain auger 10 has an infeed 16 wherein the auger extends beyond the casing 12 and an opposite outfeed end 17 having a spout 18 for directing the conveyed material to a truck or other type of storage or transport 19. The auger 11 extends longitudinally through the tubular casing 12 and is driven by a motor assembly 20 mounted on a frame of the wheel supported structure. The motor 20, through a V-belt or other type of drive 21, drives a pulley 22 which, in turn, through a transmission or gear assembly, drives a shaft 23 extending longitudinally along the casing 12 to the discharge end. The driven shaft 23 has a gear 24 secured thereto meshing with a gear 25 secured rigidly to a shaft extending through the central part of the auger 11. The auger 11 is thereby driven by the motor 20 to convey material from the infeed end 11 to the discharge spout 18.

Conventionally the supports 14 and 15 are arranged such that the discharge end of the grain auger may be raised and lowered by jack. This is all known in the prior art and forms no part of the present invention.

The auxiliary conveyor assembly 50, illustrated in FIGS. 1 – 5 inclusive, consists of an endless belt 51 having a plurality of cleats 52 mounted thereon at longitudinally spaced intervals. The belt passes around sprockets 53 and 54 mounted on shafts journalled for rotation on a frame. The belt preferably is a reinforced rubber belt of the type used as a driving track on snow vehicles. The belt has a place thereon such as recesses or openings meshing with the teeth of the drive sprockets. The cleats 52 are preferably reinforced rubber plate-like or cup-shaped members and the sprockets also preferably are made of rubber as this prevents crushing the grain.

The sprockets 53 and 54 supporting the endless belt 52 are supported on a longitudinally adjustable frame consisting of square in cross-section telescopically arranged members 55 and 56. A pin or the like 57 passes through aligned apertures in the respective members 55 and 56 retaining the sprockets 53 and 54 in a selected spaced apart relation. A series of apertures 58 are provided in member 56 thereby providing means to longitudinally adjust the length of the frame. The members 55 and 56 terminate respectively at opposite ends in forks 59 and 60 on which the respective sprockets 54 and 53 are journalled. Inverted U-shaped members 61 and 62 are secured to respective members 55 and 56 by a cross bar 63. The U-shaped members assist keeping the belt in place and also the upper portion serves as a handle facilitating handling the conveyor assembly. The lower ends of the respective U-shaped members 61 and 62 provide legs to support the assembly on for example the floor of a bin.

A drive shaft 64 is connected to sprocket 54 at one end and the opposite end is connected to a hydraulic motor 65 for driving the sprocket. The hydraulic motor 65 is mounted on a bracket 66 secured to and projecting from the U-shaped member 61. The motor 65 drives the belt in a counter-clockwise direction as viewed in FIGS. 2 and 3 and the bottom run of the belt 51 is positioned such that the tips of the blades or cleats 52 sweep over the surface of the floor moving grain therewith toward the infeed end of the conveyor 10.

Figure 7:
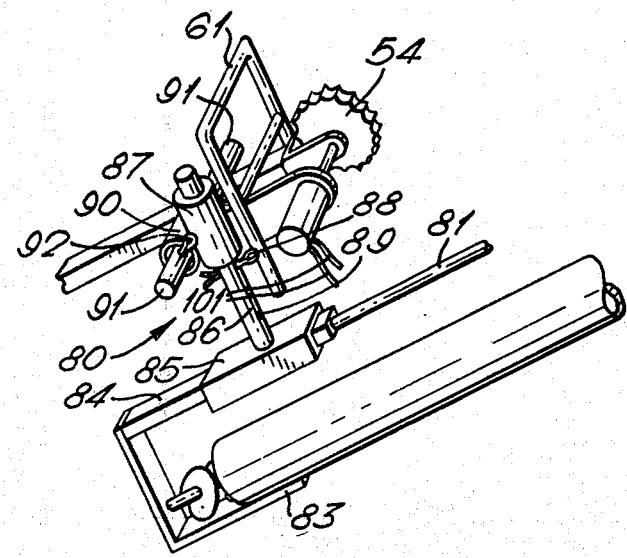
FIG. 7 is a detailed partial oblique view of means detachably, pivotally and slidably connecting the auxiliary conveyor assembly to the grain auger.

The assembly 50 is connected to the grain auger 10 by a sliding pivot assembly 80 illustrated in detail in FIG. 7. The assembly 80 includes a bar 81 having one end thereof attached to the conveyor casing 12 at 82 and the opposite end attached to the infeed end of a conveyor housing by an L-shaped bracket 83. The infeed end of the auger 11 may if desired be journalled in the bracket 83. The member 81 consists of a rod circular in cross-section extending longitudinally of the conveyor casing and parallel thereto at a position spaced therefrom terminating in a square in cross-section portion 84 connected to the bracket 83. A sleeve 85 is slidably mounted on the rod 81 and is square internally in cross-section to slidably fit onto the square end portion 84 of the rod. The sleeve 85 has a rod 86 attached thereto and projecting upwardly therefrom on which a sleeve 87 is slidably mounted. The sleeve 87 is supported at various selected vertical elevations by a cotter pin 88 located in one of vertically spaced holes 89 in the rod 86.

Figure 5:
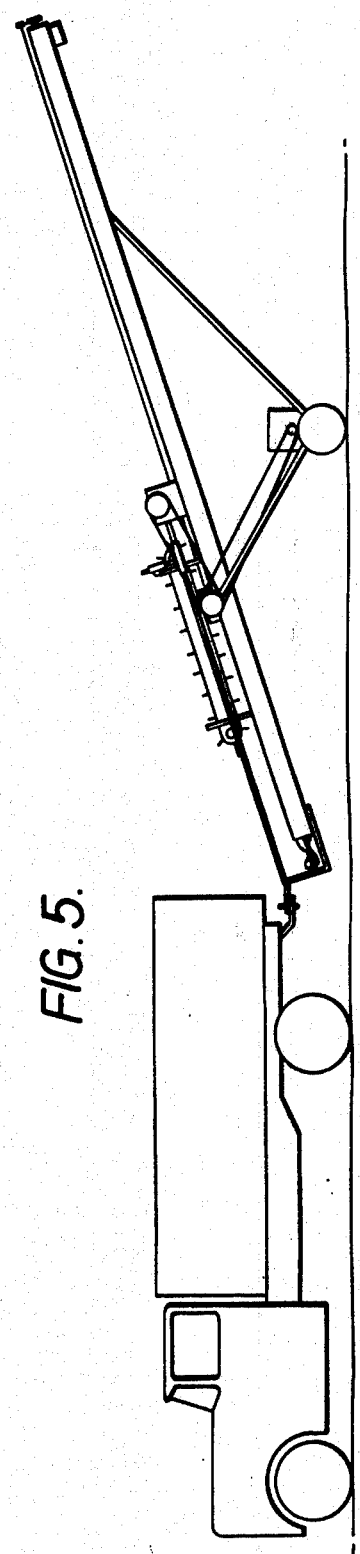
FIG. 5 is a side elevational view similar to FIG. 4 showing the auxiliary conveyor assembly loaded on the grain auger and the entire unit connected to the trailing end of a truck for transport to another location.

The sleeve 87 has a further sleeve 90 secured thereto with the axis thereof perpendicular to the axis of sleeve 87. A rod 91 secured to and projecting from the frame member 55 passes through the sleeve 90 thereby mounting one end of the conveyor attachment 50 on the grain auger 10. A cotter pin or the like means 92 passing through shaft 91 may be used to retain the shaft in the sleeve. The shaft 86 and sleeve 87 and shaft 91 and sleeve 90 provide a universal pivotal connection between the conveyor attachment 50 and the conveyor 10. The sleeve 85 slidably mounted on rod 81 permits slidably moving the conveyor attachment along the conveyor from an operative position as illustrated in FIG. 2 to a transport position as illustrated in FIG. 5. The squared sleeve 85 and squared end portion 84 of rod 81 prevents rotation of the conveyor attachment relative to the conveyor along a portion of the sliding position. The length of squared portion 84 for example is approximately two feet. This retains the conveyor attachment in an operative orientation when the outer end for example is not supported by the floor and instead carried by the operator to move the same about the bin.

The hydraulic motor 65, which drives the endless belt, is driven by a hydraulic pump 100 supplied with fluid from the pump by hoses 101 and controlled by a manually operative control means 102. The pump 100 is mounted on the conveyor casing 12 at a position spaced from the drive V-belt pulley 22 and is driven by a further drive belt 103 passing around a pulley (not illustrated but which is secured to the same shaft as the pulley 22) and a V-belt pulley 104 secured to the rotary shaft of the pump. The manually operative control means 102 consists of a flexible cable or rope connected to a suitable valve and which may be turned on and off by an operator manually handling the assembly 50. The valve is biased to a normally closed position thereby automatically stopping the endless belt when the operator releases the control.

From the foregoing it will be seen there is provided an auxiliary infeed conveyor unit pivotally and detachably connected to a grain auger for use in sweeping the grain on the floor of the bin toward the infeed end 16 of the conveyor 10. The assembly 50 may, if desired, include a stop or abutment 105 (see FIG. 3) secured to the member 62 for engaging a side wall of the bin preventing direct engagement of the driven belt with the wall during operation.

In order to transport the assembly 50, it is slid into a piggyback position, as illustrated in FIG. 5, on the conveyor 10 by the operator carrying the free end of the conveyor attachment and sliding the sleeve 85 on rod 81, to a position adjacent the pump unit 100. The leg portions of the U-shaped support brackets 61 and 62 engage brackets B (one of which is shown in FIG. 1) secured to the casing 12 of the conveyor 10 retaining the same in the piggyback transport position. The rod 81 and sleeve 85 permit pivoting the assembly 50 on the circular in cross-section portion of rod 81 during sliding to avoid obstacles such as the gear box and the like attachments on the conveyor casing 12.

An alternative arrangement for the auxiliary conveyor is illustrated in FIG. 8 and which consists of an auger unit 110 mounted on a support bracket at one end by a member 111 and at the opposite end is manually carried or moved by a handle member 112 pivotally attached thereto by a suitable journal member 113. Attached to the support 111 is a hydraulic motor 114 powered by the oil pump 100 through a flexible hose 101, the fluid of which is controlled as in the previous embodiment through a manually operative control means 102. The support bracket 111 is constructed such as to be supported upon the floor of a grain bin preventing the motor housing from rotating. The auger unit 110 also may be pivotally and slidably connected to the grain auger 10 by the previously described assembly 80 in which case a shaft corresponding to shaft 91 is secured to member 111 and projects laterally therefrom.

Figure 6:
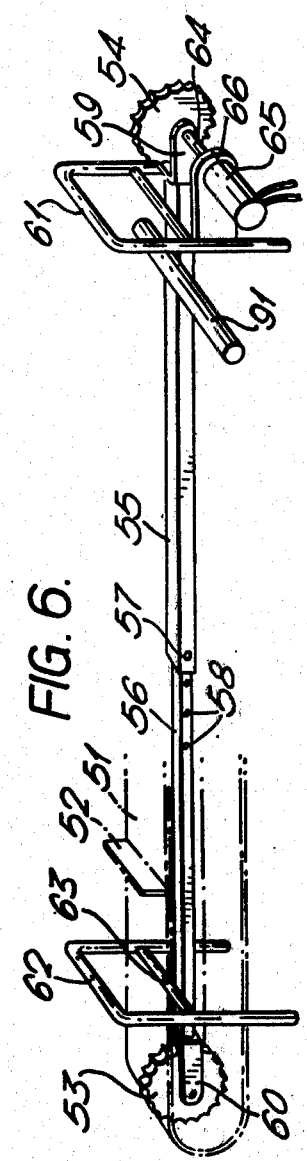
FIG. 6 is an oblique view of the frame portion of one embodiment of the auxiliary conveyor assembly.

In FIGS. 6 and 7 the shaft 91 is shown secured to the frame member 55 and projecting laterally therefrom. Alternatively it may be secured to the frame member 61 in which case brackets on casing 12 would project laterally from the casing to support the legs of frames 61 and 62 to carry the assembly 50 in the piggyback transport position.

In the foregoing reference is made to grain auger 10 and it is obvious other conveyors may be used in conjunction with the assembly 50. However the auger type conveyor illustrated is the most commonly used in handling grain, fertilizers and the like.

Figure 9:
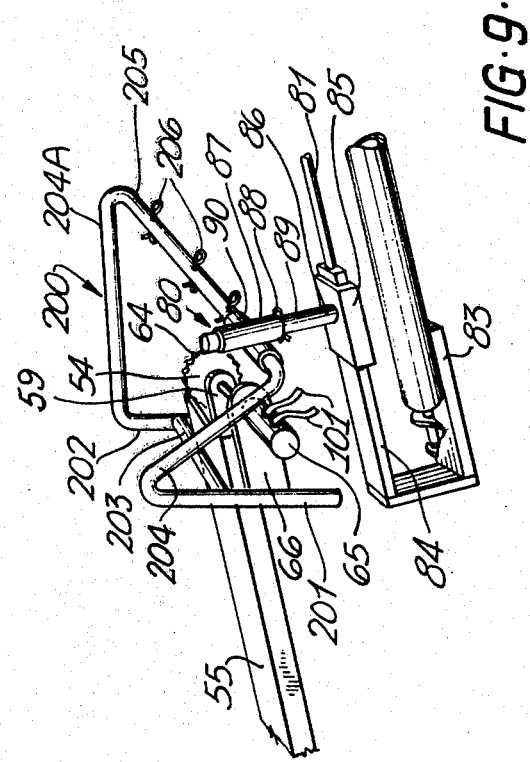
FIG. 9 is a view similar to FIG. 7 illustrating a modification for attaching the auxiliary conveyor assembly to the grain auger.

In FIG. 9 there is illustrated a modified means of connecting the sliding pivot assembly 80 to the frame of the auxiliary conveyor. The modified connection is designated generally by the reference numeral 200 and includes a pair of upstanding legs 201 and 202 interconnected intermediate their length by a cross member 203. The cross member 203 is secured as by welding or the like to member 55 of the frame of the auxiliary conveyor and the uprights 201 and 202 project therebelow providing a support for the drive end of the auxiliary conveyor. Connected to the upper ends of the respective legs 201 and 202 are bar members 204 and 204A which in turn are interconnected at their opposite ends by cross bar 205. In side elevational view members 202 and 204A are approximately perpendicular to one another while members 201 and 204 are arranged at an acute angle thus resulting in member 205 sloping from one side to the other. When connected to the main auger the slope is in a direction downwardly toward such auger. This results in a tendency of the auxiliary conveyor to slide in a direction to overlie the main conveyor. This can be of benefit during piggyback transfer of the auxiliary conveyor on the auger in the event of the loss of a cotter pin utilized to retain the sliding pivot 80 in preselected positions on bar 205. Preferably, however, bar 204 and upright 201 are arranged at approximately right angles to one another.

Leg members 201 and 202 may be disposed substantially vertically or alternatively slope inwardly and upwardly in a direction towards one another having a distance therebetween at the top less than at the bottom. Member 205 can be of any desired length and preferably substantially longer than the distance between the respective legs 201 and 202. This provides means for variously positioning the auxiliary conveyor relative to the auger in positions varying from longitudinal alignment with the auger to positions laterally offset therefrom.

The sleeve 90 of member 80 is slidably mounted on member 205 and is retained in various selected positions in a direction transverse to the length of the auger by cotter pins 206. As in the previous embodiment, sleeve 87 of member 80 is vertically adjustable on post 86 and is retained in preselected vertical positions by cotter pins 88 passing through an aperture 89 in the post 86.

In plan view of the arrangement illustrated in FIG. 9, member 204A is parallel to member 55 of the frame while member 204 is disposed at an angle thereto.

I claim:
1. In combination
   a. a grain elevator conveyor of the type having a driven auger type conveying element extending longitudinally within a casing mounted on a supporting structure adapted for adjustably positioning the angle of inclination of the elevator conveyor, said casing having an infeed end normally supported on the ground at a position spaced from the supporting structure and an elevated outfeed end;
   b. a longitudinally extending auxiliary conveyor having a conveying element, consisting of an endless belt member with cleats thereon, for receiving material along the lower surface thereof, said belt member having a series of openings meshing with the teeth of a driven sprocket and an idler supported in spaced apart relation and on which the belt conveying element runs;
   c. means slidably and universally pivotally connecting one end of said auxiliary conveyor to the casing of the elevator conveyor, said auxiliary conveyor being slidable longitudinally along said casing from a first position wherein it extends from the infeed end of the casing in a direction away therefrom providing an extension to the elevator conveyor for sweeping material in the vicinity thereof toward said infeed end to a second position wherein said auxiliary conveyor is supported in piggy-back fashion on the casing of said elevator conveyor, said connecting means further including adjusting means permitting varying the relative position of the auxiliary conveyor and elevator conveyor in each of a vertical and horizontal direction;
   d. power driven means mounted on said auxiliary conveyor and drivingly connected to said sprocket for driving auxiliary conveying element; and
   e. remove control means for controlling the driving of said auxiliary conveying element.

2. The combination as defined in claim 1 including means preventing rotation of the slidable mounting for at least a portion of sliding movement thereof adjacent the infeed end of the elevator conveyor.

3. The combination as defined in claim 1 wherein said drive means comprises a hydraulic motor.

4. The combination as defined in claim 1 wherein said means slidably connecting the auxiliary conveyor to the elevator conveyor comprises a longitudinally extending bar secured at opposite ends to the casing of the elevator conveyor, said bar being spaced from the casing and having one end attached thereto at the infeed end thereof and a sleeve connected to the auxiliary conveyor and slidably mounted on said bar.

5. The combination as defined in claim 1 wherein said means connecting the auxiliary conveyor to the elevator conveyor comprises:
   a. a longitudinally extending bar secured at opposite ends to the casing of the elevator conveyor, one end being located adjacent the infeed end of the elevator conveyor and the other end spaced therefrom;
   b. a sleeve slidably mounted on said bar;
   c. a first rod secured to and projecting from said sleeve in a direction transverse to the length of said bar;
   d. a second rod secured to and projecting from the frame of the auxiliary conveyor; and
   e. a pair of sleeves rigidly interconnected and having their axes arranged substantially perpendicular to one another, said pair of sleeves being slidably mounted on respective ones of said first and second conveyor.

6. In combination
   a. a grain elevator conveyor of the type having a driven auger type conveying element extending longitudinally within a casing mounted on a supporting structure adapted for adjustably positioning the angle of inclination of the elevator conveyor, said casing having an infeed end normally supported on the ground at a position spaced from the supporting structure and an elevated outfeed end;
   b. a longitudinally extending auxiliary conveyor having a conveying element, consisting of an endless belt member with cleats thereon, for receiving material along the lower surface thereof, said belt member having a series of openings meshing with the teeth of a driven sprocket and an idler supported in spaced apart relation and on which the belt conveying element runs;

c. means connecting the auxiliary conveyor to the elevator conveyor comprising a longitudinally extending bar secured at opposite ends to the casing of the elevator conveyor, one end being located adjacent the infeed end of the elevator conveyor and the other end spaced therefrom, a sleeve slidably mounted on said bar; a first rod secured to and projecting from said sleeve in a direction transverse to the length of said bar, a second rod secured to and projecting from the frame of the auxiliary conveyor, and a pair of sleeves rigidly interconnected and having their axes arranged substantially perpendicular to one another, said pair of sleeves being slidably mounted on respective ones of said first and second conveyor;

d. power driving means mounted on said auxiliary conveyor and drivingly connected to said sprocket for driving auxiliary conveying element; and e. remote control means for controlling the driving of said auxiliary conveying element.

* * * * *